United States Patent [19]

Norman

[11] 4,000,679

[45] Jan. 4, 1977

[54] FOUR-CHANNEL COLOR ORGAN

[76] Inventor: Richard E. Norman, Rte. 8, Box 173, Easley, S.C. 29640

[22] Filed: July 7, 1975

[21] Appl. No.: 593,794

[52] U.S. Cl. .............................. 84/464; 84/DIG. 9; 84/DIG. 18; 84/477 R

[51] Int. Cl.$^2$ .................... A63J 17/00; G09B 15/02

[58] Field of Search ............. 84/DIG. 18, 464, 477, 84/478; 340/334

[56] References Cited

UNITED STATES PATENTS

| | | | |
|---|---|---|---|
| 2,275,283 | 3/1942 | Burchfield | 84/464 |
| 3,163,077 | 12/1964 | Shank | 84/464 |
| 3,228,278 | 1/1966 | Wortman | 84/464 |
| 3,555,505 | 1/1971 | Srogi | 340/24 |
| 3,598,889 | 8/1971 | Switsen | 84/464 |
| 3,623,392 | 11/1971 | Boyer | 84/464 |

*Primary Examiner*—E. S. Jackmon
*Attorney, Agent, or Firm*—Bailey, Dority & Flint

[57] ABSTRACT

A color organ device for producing a visual display of lights responsive to electrical signals produced on respective channels of a four-channel stereo. The device includes a housing having a plurality of banks of lights therein which is rotated by an electric motor. A interpreter is provided for selectively separating the frequencies produced by the four-channel stereo for selectively energizing the banks of lights. Slip-rings are provided for making electrical contact between respective frequency discriminating circuits and the banks of lights.

6 Claims, 2 Drawing Figures

FOUR-CHANNEL COLOR ORGAN

BACKGROUND OF THE INVENTION

The present invention relates to a color organ device and, more particularly, to a color organ device which illuminates respective banks of lights carried within a rotating plexiglass housing responsive to different frequencies produced by respective channels of a four-channel stereo.

Various color organ devices have been produced heretofore for producing visual interpretations of electrical currents. One such device is shown in U.S. Pat. No. 2,275,283 granted on Mar. 3, 1942 to R. D. Birchfield. Another such device is disclosed in U.S. Pat. No. 3,228,275 granted on Jan. 11, 1966 to L. A. Wortman. Still another such device is disclosed in U.S. Pat. No. 3,162,077 granted to C. A. Shank on Dec. 29, 1964. While all of these devices, as well as many other different types, disclose apparatus for illuminating electric lamps responsive to current variations, they normally require complicated electrical circuitry.

SUMMARY OF THE INVENTION

The invention includes a color organ device for producing a visual display responsive to electrical signals produced on respective output channels of a four-channel stereo system. The device includes a plurality of frequency discriminating circuits coupled to the output channels of a stereo system, each of which is activated by the particular frequency range. Enclosed within a housing are a plurality of banks of lights mounted behind translucent panels for illuminating the panels according to the frequencies produced by the stereo. An output shaft and electric motor is connected to the housing for rotating the housing. A plurality of electrically conductive slip rings are carried by the output shaft of the motor for providing electrical connections between the frequency discriminating circuits and respective banks of the lights. A trigger circuit is interposed in each of the discriminating circuits for connecting a voltage source to the respective banks of lights responsive to the discriminating circuits being activated by a particular frequency range. The trigger circuit include a silicone control rectifier having anode, cathode and trigger electrodes with the anodes being connected to the voltage source and the cathodes being connected to a respective slip ring. The trigger electrodes are connected to a respective discriminating circuit so that when such is activated, connection is made through the triggering circuit between the voltage source and the lamps to turn the lamps on.

Accordingly, it is an important object of the present invention to provide a color organ which illuminates respective banks of lights carried within a rotating plexiglass housing responsive to different frequencies produced by the respective channels of a four-channel stereo.

Another important object of the present invention is to provide a color organ wherein selective frequencies are applied through slip rings carried on a rotating shaft to respective banks of lights for illuminating the lights when such are present.

Still, another important object of the present invention is to provide a color organ which can be readily attached to the output channels of a four-channel stereo for producing a visual display be illuminating respective banks of lights responsive to the frequencies produced by the respective channels.

These and other objects and advantages of the invention will become apparent upon reference to the following specification, attendant claims, and drawings.

DESCRIPTION OF THE PREFERRED EMBODIMENT

Figure 1:
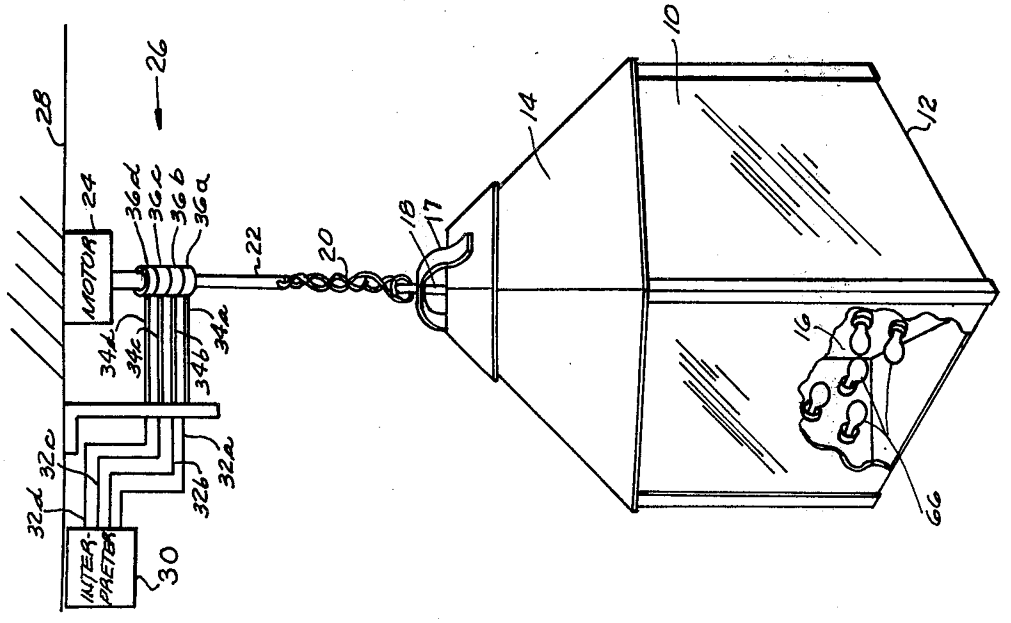
FIG. 1 is a perspective view partially shown in schematic form illustrating a color organ constructed in accordance with the present invention.

In FIG. 1 there is shown one type of housing in which lights may be carried that are to be illuminated responsive to the frequencies produced by a four-channel stereo system. The housing includes four side walls 10 which are enclosed by a bottom wall 12 and an upwardly extending top 14. The side walls 10 may be constructed of any suitable translucent material such as plexiglass so that illumination made by lights carried within the housing may be seen therethrough. The interior of the housing is divided diagonally into four sections by means of partitions such as shown at 16 wherein behind each side panel 10 there is a V-shaped configuration of partitions upon which banks of lights are mounted.

In one particular apparatus, the banks of lights behind each of the panels 10 are of a different color such as red, yellow, blue and green. These banks of lights are selectively turned on and off responsive to the frequencies produced by the stereo.

Positioned on top of the housing 14 is a decorative handle 17 through which a pipe 18 extends for securing a chain 20 thereto. The lower end of the pipe 18 is suitably fixed to the housing for supporting such. The upper end of the chain 20 is, in turn, connected to a shaft 22 which is directly coupled to an output shaft of a motor 24 for rotating therewith. The motor 24 is, in turn, carried within any suitable housing (not shown) which is adapted to be mounted by any suitable means to a ceiling 28. It is to be understood, of course, that instead of hanging the housing from the ceiling, it could be suitably supported from the bottom and supported on the floor. An interpreter device, as shown in the block 30, is coupled to each of the output channels of a four-channel stereo and selectively couples a power source to the bank of lights 18 carried within the housing responsive to the frequencies produced thereby. The power source, not shown in FIG. 1, is connected through the four wires **32*a* through 32*d* to flexible contact arms 34*a* through 34*d* which ride on respective slip-rings 36*a* through 36*a* carried on the rotating shaft 22. Individual wires extend from the slip-rings 36*a* through 36*d* through the hollow pipe 22 down through the chain 20** into the housing to be connected to the respective banks of lights carried therein. Therefore, electrical power can be supplied to the banks of lights carried within the housing as such is rotated.

Figure 2:
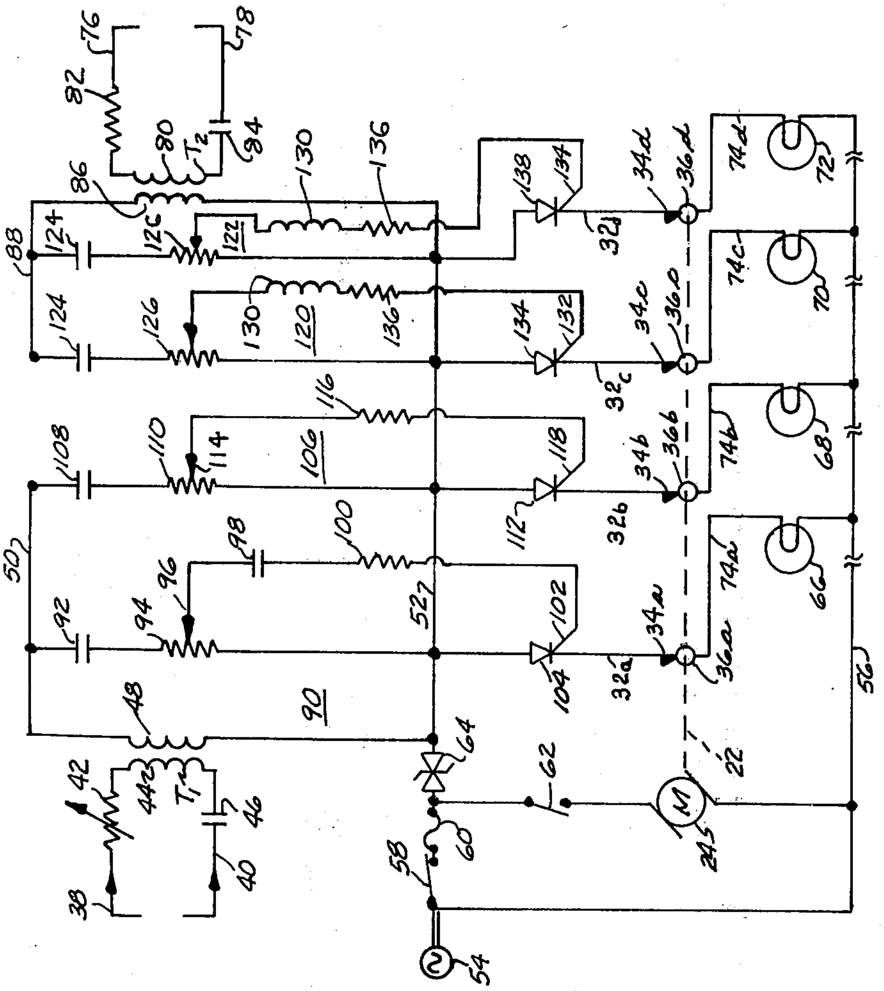
FIG. 2 is a schematic diagram illustrating the electrical circuit used in the color organ.

Referring now to FIG. 2 of the drawings, the details of the interpreter will be described. The output from the four-channel stereo, not shown, is combined to produce two composite signals, each of which signal includes the signals produced by two of the channels of the stereo. One of the composite signals is supplied across leads 38 and 40 and is fed through a variable resistor 42 which controls the amptitude thereof. This composite signal is then fed to the primary winding 44 of a first transformer T1. It is noted that a filter capacitor 46 is coupled to the primary winding 44 of transformer T1 for filtering out unwanted signals and noises.

An output winding 48 of transformer T1 is coupled across leads 50 and 52. A source of AC voltage 54 is coupled across lead 52 and lead 56 through an on-off switch 58 and a fuse 60. The AC power provided by the source 54 is used for energizing the motor 24 connected in a circuit interposed between leads 52 and 56. Connected in series with motor 24 is an on-off switch 62 for selectively energizing the motor. Interposed in lead 52 is a Zener diode 64 which prevents feedback from the circuit.

The motor 24 has a shaft 22 extending outwardly therefrom upon which the four slip rings 36a through 36d are carried and are rotated therewith. The purpose of these slip rings 36a through 36d is to provide a current path from the interpreter to banks of light designated by the reference characters 66, 68, 70 and 72. While only a single light of each bank is shown in the schematic diagram of FIG. 2, it is to be understood that lights 66 through 72 represent a plurality of lights connected in parallel. Flexible electrically conductive arms 34a through 34d are provided for making contact with respective slip rings 36a through 36d. Electrical conductors 74a through 74d extend from the slip rings 36a through 36d, respectively, to the banks of lights 66 through 72.

The general purpose of the interpreter 30 is to selectively connect the source of power 54 to the banks of lights 66 through 72 responsive to frequencies beinng supplied to frequency discriminating circuits carried within the interpreter 30.

While it has been previously described that one composite signal is fed to the primary winding 44 of transformer T1 which includes a range of two frequencies, it is to be understood that the other two channels of the stereo are connected to leads 76 and 78 which are, in turn, coupled to a primary winding 80 of a second transformer T2. A variable resistor 82 is interposed in lead 76 for varying the ampitude of the signal being supplied thereto from the four-channel stereo. Interposed in lead 78 is a coupling capacitor 84 which acts to filter out signals coming to the primary winding 80 of the transformer T2 for preventing unwanted noises and signals.

Transformer T2 has an output winding 86 which is connected between leads 88 and 52 for coupling a composite signal from transformer T2 to two of the discriminating circuits shown on the right in the schematic.

The first composite signal, as previously mentioned, is fed across leads 50 and 52 to a first frequency discriminating circuit 90 which includes a capacitor 92 and a variable resistor 94. A wiper arm 96 is provided for the variable resistor 94 and has connected in series therewith a capacitor 98 and a resistor 100. The other side of the resistor 100 is connected to a trigger electrode 102 of a first silicone control rectifier 104 forming part of a trigger circuit. A cathode side of the silicone control rectifier 104 is, in turn, connected to the slip ring 36a through the flexible contact arm 34a.

The anode side of the silicone control rectifier 104 is connected to the variable resistor 94.

A second discriminating circuit is also connected between leads 50 and 52 and includes a capacitor 108 connected in series with a variable resistor 110 and a silicone control rectifier 112. A wiper arm 114 of the variable resistor 110 is connected through a resistor 116 to a triggering electrode 118 of the silicone control rectifier 112. It is noted that the cathode electrode of the silicone control rectifier 112 is, in turn, connected to slip-ring 36b.

First, the operation of separating the first composite signal that is impressed across the primary winding of transformer T1 will be discussed. This composite signal extends over a range of frequencies that is covered by two of the channels of the stereo. The values for the components included in the first discriminating cirucit 90 are selected so that a frequency of a particular range when appearing on the secondary winding 48 of transformer T2 triggers the silicone control rectifier 104 connecting the potential source 54 to the lamps 66 causing such to be illuminated.

If the first composite signal extends over a frequency range that covers the range set by both the silicone control rectifier 104 and the silicone rectifier 112, such will illuminate both banks of bulbs 66 and 68.

The frequency range of each of the discriminating circuits 90, 106, 120 and 122 is controlled by the values of the components included therein. As previously mentioned, the discriminating circuit 90 is provided for illuninating the bank of lamps 66 and the discriminating circuit 106 is provided for controlling the illuminating of the lamps 68. Similarly, the discriminating circuit 120 controls the illumination of lamps 70, while discriminating circuit 122 controls the illumination of the lamps 72. The lamps 66 and 68 are illuminated by frequencies in a low and low-mid range whereas the lamps 70 and 72, respectively, are illuminated by high and high-mid range frequencies.

The frequency discriminating circuit 120 includes a capacitor 124 which is coupled to one side of a variable resistor 126. The other side of variable resistor 126 is, in turn, connected to lead 52. Wiper arm 128 of variable resistor 126 is connected to one side of an inductor 130. The other side of the inductor 130 is connected to a trigger electrode 132 of a silicone control rectifier 134 by means of a resistor 136. The cathode electrode of the silicone control rectifier 134 is connected to the flexible conductive arm 34c which rides on the slip-ring 36c.

The discriminating circuit 122 is constructed in the same manner as discriminating circuit 120 except for the values of components therein, therefore, like reference characters will be used therein except for the silicone control rectifier which will be identified by reference character 138.

It is noted that the first discriminating circuit 90 has a capacitor 98 and a resistor 100 therein wherein the second discriminating circuit 106 merely has a resistor 116 therein. The third discriminating circuit 120 has an inductor 130 and a resistor 136 similar to that of the fourth discriminating circuit 122. By using these different components, as well as different values for the components, such enables the discriminating circuits 90, 106, 120, and 122 to be activated to cause the lamps associated therewith to be energized by different frequency ranges.

Normally, different colored bulbs are used within respective banks of lamps 66, 68, 70 and 72 to produce the desired visual effect from the four-channel stereo system. However, in some instances white lamps could be used with colored plexiglass placed over the front panel for producing a similar effect.

While a preferred embodimemt of the invention has been described using specific terms, such description is for illustrative purposes only, and it is to be understood that changes and variations may be made without departing from the spirit or scope of the following claims.

What is claimed is:

1. A color organ device for producing a visual display responsive to electrical signals produced on respective output channels of a four channel stereo system, said color organ device including:

A. a housing having display panels therein,

B. a plurality of banks of lights located behind said panels for illuminating said panels upon being energized, C. an electric motor having a rotating output shaft connected to said housing for rotating said housing, D. an interpreter means connected to said output channels of said stereo for producing a plurality of signals responsive to various frequency ranges produced on said output channels of said stereo.

E. a plurality of electrically conductive slip rings. carried by said output shaft of said motor for providing an electrical path between said interpreter means and said banks of lights for energizing said lights responsive to respective signals produced by said interpreter means.

whereby said banks of lights are energized according to the frequency ranges contained in the electrical signals produced by said stereo.

2. The color organ display device as set forth in claim 1 wherein said interpreter means includes:

A. a first and second transformer,

B. means for connecting the signals from two of said channels of said stereo to said first transformer and means for connecting the remainder of said channels to said second transformer, C. a first plurality of frequency discriminating circuits connected to said first transformer and a second plurality of frequency discriminating circuits connected to said second transformer, D. a voltage source connected to said discriminating circuits, E. a plurality of trigger circuits each of which being connected to a respective frequency discriminating circuit for being triggered on responsive to a particular frequency being supplied by said stereo, and F. said banks of lights each being connected to a respective trigger circuit for being energized by said voltage source responsive to a particular frequency being produced by said stereo.

3. The color organ as set forth in claim 2 wherein at least one of first plurality of discriminating circuits includes a resistor and capacitance networks for separating out a frequency from said first transformer.

4. The color organ as set forth in claim 3 wherein said second plurality of discriminating circuits each include inductive and resistance networks of different values for separating out signals of different frequencies from said second transformer.

5. A color organ device for producing a visual display responsive to electrical signals produced on respective output channels of a four-channel stereo system, said color organ device including:

A. a plurality of frequency discriminating circuits coupled to the output channels of said stereo system each of which being activated by a particular frequency range, B. a housing having display panels therein, C. a plurality of banks of lights located behind said panels for illuminating said panels upon being energized, D. an electric motor having an output shaft connected to said housing for rotating said housing, E. a plurality of electrically conductive slip-rings carried by said output shaft for providing electrical connections between said frequency discriminating circuits and respective banks of said lights, F. a voltage source connected to said discriminating circuits, G. a trigger circuit interposed in each of said discriminating circuits for connecting said voltage source to respective banks of said lights responsive to said discriminating circuits being activated by a particular frequency range, whereby said banks of lights are illuminated in accordance with the various frequencies being produced by said stereo.

6. The color organ as set forth in claim 5 wherein each of said trigger circuits includes a silicone control rectifier having anode, cathode and trigger electrodes, said anode being connected to said voltage source and said cathode being connected to a respective slip-ring, and said trigger electrode being connected to a respective discriminating circuit.

* * * * *